Patented Nov. 17, 1925.

1,561,942

UNITED STATES PATENT OFFICE.

ERWIN E. A. G. MEYER, OF DETROIT, MICHIGAN, ASSIGNOR TO MORGAN & WRIGHT, OF DETROIT, MICHIGAN, A CORPORATION OF MICHIGAN.

PROCESS OF SPLICING UNCURED RUBBER COMPOUNDS.

No Drawing.    Application filed February 24, 1925. Serial No. 11,167.

*To all whom it may concern:*

Be it known that I, ERWIN E. A. G. MEYER, a citizen of the United States, and a resident of Detroit, county of Wayne, State of Michigan, have invented certain new and useful Improvements in Processes of Splicing Uncured Rubber Compounds, of which the following is a full, clear, and exact description.

This invention relates to an improved process of splicing uncured rubber compounds.

Many rubber articles are prepared in such a way that there are seams to be joined, requiring a cementing operation or its equivalent. In those instances where the splicing or joining is carried out on the unvulcanized stocks, the joint is frequently spoiled by the appearance of "bloom" on the freshly cut surfaces. Rubber cements and other methods of splicing do not give a satisfactory joint when applied to raw surfaces which have become covered with this bloom of sulphur. The result of such unsatisfactory adhesion is that the article being prepared is spoiled and the rubber stock becomes waste. The ordinary practice of preparing splices is to cut the raw stock with a wet knife and then to brush the freshly cut surfaces with a steel brush or other instrument in order to roughen the surface. The surface is then washed with gasoline or benzol in order to make it somewhat sticky. The surfaces are then joined in the manufacture of the article in question. The use of a coating of rubber cement on the freshly cut surfaces is not particularly economical, and does not give a satisfactory splice if the bloom of sulphur has not been first removed from the cut surfaces. Another disadvantage in the known methods of splicing is that the cutting knife, when solvents are used, gradually accumulates a coating of rubber cement. When water is used to wet the knife in order to facilitate cutting the rubber stock, a bloom of sulphur appears on the cut surface and unless removed causes an unsatisfactory splice. The present invention is concerned with an improved process which overcomes the disadvantages of the known methods of preparing rubber surfaces for splicing.

Accordingly the invention has for its object a new method of preparing rubber surfaces for splicing. It also has as one of its objects the elimination of bloom from the cut surfaces. A further object is the elimination of scrap stock resulting from unsatisfactory splicing in the manufacture of rubber articles.

With a particular embodiment in mind but without intention to limit the invention beyond what may be required by prior art, the invention, broadly stated, comprises severing rubber with a cutting implement wet with water, and applying a coating of a rubber dispersion to the freshly cut surface. It also includes the use of a rubber dispersion as the fluid with which the cutting implement is wetted.

As a specific example, a cutting tool such as a knife is dipped in water and the particular compounded rubber stock is then severed. Without waiting for the water to dry from the freshly cut surface, a coating of a rubber dispersion, as for example rubber latex, is applied thereto and allowed to dry. As soon as the rubber coating thus applied has become dry, the splice is made and the article further subjected to whatever steps may be necessary in its further assembly and vulcanization. One of the advantages of preparing the surfaces is that the coating of rubber applied after the cutting operation dries as rapidly as a rubber cement, and at the same time deposits an amount of rubber on the surface which may be as much as three times the quantity which can be deposited by a cement coating. A coating of rubber thus applied has the property of preventing the bloom of sulphur to the freshly cut surface and therefore completely eliminates the necessity of having to brush or otherwise clean the surface prior to joining. All use of solvent is obviated. The spliced joint after vulcanization shows a high degree of adherence and substantially eliminates all of the former wastage of vulcanized rubber due to unsatisfactory splicing. As a specific application of this method the splicing of the tread stock of tires is cited.

Another method of carrying out this invention involves the use of a rubber dispersion as the coating fluid. In this method, the cutting implement is dipped in a rubber dispersion as for example rubber latex or artificial rubber latex and the further procedure is the same as in the above example.

The invention is particularly suitable for splicing stocks which are of appreciable thickness, as for example the compounded stocks which are reduced to their final form by means of a tubing machine. The invention, however, is not limited to tubed stocks but may be applied just as well to plied stocks and in general to all raw rubber stocks which require cutting and splicing in the course of assembly into articles.

This invention is of particular utility for splicing in moisture-laden atmospheres, for instance, in humid weather. When benzol or gasoline solutions are used in splicing during humid atmospheric conditions, the reduction in temperature caused by evaporation of the solvent condenses moisture from the air and causes a film of moisture to be deposited on the rubber stock which is to be spliced. Firm adhesion of a cemented splice is then difficult to obtain. The use of latex in splicing eliminates this disadvantage and at the same time makes it possible to dispense with the costly humidity control installations which would otherwise be required in splicing rooms where rubber cements are employed.

Having thus described my invention, what I claim and desire to protect by Letters Patent is:

1. A method of treating unvulcanized rubber which consists in severing the rubber, and coating the freshly exposed surfaces with an aqueous dispersion of rubber.

2. A method of treating unvulcanized rubber which consists in severing the rubber, and coating the freshly exposed surface with rubber latex.

3. A method of treating unvulcanized rubber which consists in wetting the cutting tool with a rubber dispersion, and separating the rubber therewith before the rubber dispersion on the cutting tool dries.

4. A method of treating unvulcanized rubber which consists in simultaneously severing the rubber, and applying an aqueous dispersion of rubber to the freshly exposed surfaces.

5. That method of splicing unvulcanized rubber articles incident to their manufacture which consists in severing the unvulcanized rubber, coating the freshly exposed surfaces with an aqueous dispersion of rubber, and subsequently joining the surfaces thus coated.

6. That method of splicing unvulcanized rubber articles incident to their manufacture which consists in severing the unvulcanized rubber, coating the freshly exposed surfaces with rubber latex, and subsequently joining the surfaces thus coated.

7. A new method of preventing bloom on freshly cut unvulcanized rubber surfaces which comprises depositing on said freshly exposed surfaces a film of raw rubber from an aqueous dispersion thereof.

Signed at Detroit, county of Wayne, State of Michigan, this 19th day of February, 1925.

ERWIN E. A. G. MEYER.